June 22, 1954    S. F. STREICKER ET AL    2,681,710
AIR LINE LUBRICATING DEVICE
Filed Dec. 19, 1951
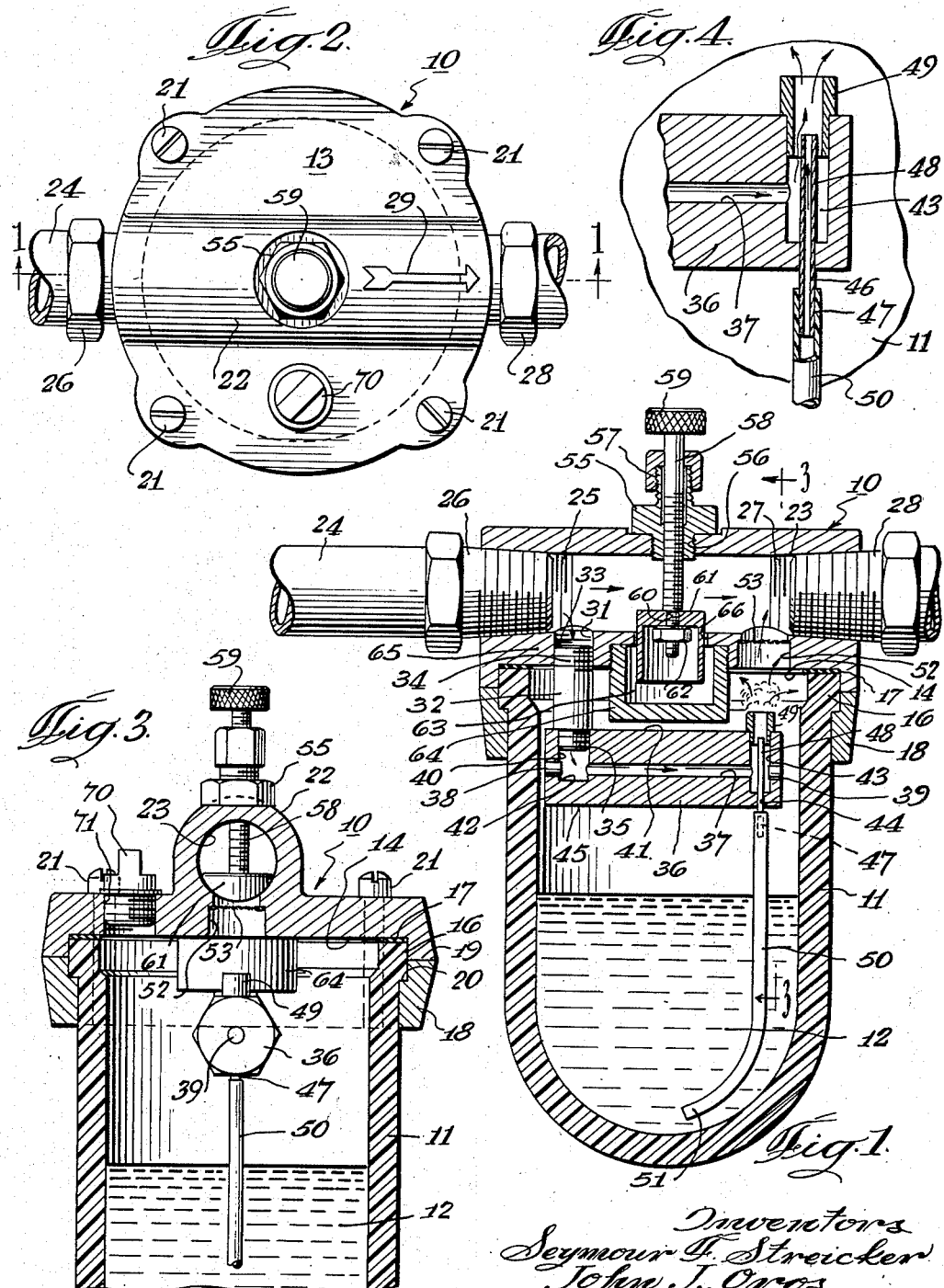
Inventors
Seymour F. Streicker
John J. Oros
John Skidmore
By I. Irving Silverman
Attorney Patented June 22, 1954

2,681,710

UNITED STATES PATENT OFFICE 2,681,710

AIR LINE LUBRICATING DEVICE

Seymour F. Streicker, John J. Oros, and John Skidmore, Chicago, Ill.

Application December 19, 1951, Serial No. 262,454

10 Claims. (Cl. 184—55)

This invention is concerned with an air lubricating device of the character designed to be connected into a compressed air line supplying pneumatically operated tools and which automatically provides lubricant to be carried through the line to the tool for lubricating same.

Prior devices of the character herewith concerned have operated on the principle of mechanically dispersing the fluid lubricant into the air line. The liquid lubricant is dropped into the air stream where it is intended to be broken into a fine aerosol or spray which passes with the air into the pneumatic tool. Where the lubricant is not adequately broken up, large droplets or clusters of oil are carried to the tool thereby increasing the tendency of the air line to "spit" or throw the large droplets or clusters of lubricant. Likewise, the excess oil in the line may result in excess oil being supplied to the tool. It is therefore highly desirable in these devices to be able in a fool-proof manner to provide fine droplets or spray in the air stream so as to avoid the adverse contingencies above enumerated.

The invention herein described is characterized by the provision of an air line lubricating device in which the lubricant is dispersed into the air stream in the form of a finely divided spray so that it is not necessary to rely on the unreliable results obtained from the breaking up of the drops of lubricant by the air stream, as in the case of prior devices. Accordingly, such is the primary object of the invention.

Another object of the invention is to provide a device of the character described having means for controlling the amount of spray entering the air stream of the device.

Still another object of the invention is to provide such an air line lubricating device which is simple and economical in operation and construction and which will operate efficiently and automatically in providing lubricant in the form of a fine spray to the air feeding the pneumatic tool.

Another object of the invention is to provide a device for lubricating air fed to pneumatically operated tools having atomizing means for breaking the lubricant into a fine spray prior to its being fed into the air stream.

Other objects of the invention lie in the provision of a device of the character described which is constructed of few parts, is compact in size, yet extremely efficient in operation and which is sturdy and durable.

These and other objects will become apparent as the description of the invention proceeds, in connection with which a preferred embodiment of the invention has been illustrated in the accompanying drawings. It is not intended to be restricted to features of form, size, proportion or minor features of the construction as minor changes therein may occur to skilled artisans without departing from the spirit of the invention.

In the drawings wherein like reference characters have been employed to indicate corresponding or similar parts throughout the several parts thereof:

Fig. 1 is a sectional view taken through an air line lubricating device constructed in accordance with our invention and showing the principles thereof.

Fig. 2 is a top plan view of the device embodying the invention.

Fig. 3 is a vertical sectional view taken through the device of Fig. 1 along the line 3—3 and in the direction indicated.

Fig. 4 is an enlarged sectional view of the atomizing means of the device and showing details of construction thereof.

The device embodying the invention is intended to be connected into a compressed air line between the source of air and the pneumatic tool so that it will operate only when the tool is operated. In this respect the operation of the device is automatic. In addition, the principle of operation of the herein device consists of withdrawing the fluid lubricant from the bowl constituting the reservoir therefor in the form of a liquid and thereafter reducing same to a finely divided spray, namely, atomizing the fluid lubricant, prior to its being fed into the air line to be carried to the pneumatic tool. To accomplish this object, we provide novel atomizing apparatus which, to the best of our knowledge, has heretofore never been used in devices of the character herewith concerned. The result of such a structure is to provide an extremely fine spray, very much finer and more thoroughly dispersed than heretofore possible, thereby eliminating the difficulties of excess lubrication, spitting, etc., tending to occur in prior art devices.

It is desirable under actual operating conditions to be able either to increase or decrease the quantity of lubricant spray being supplied to the air line. Accordingly, we also provide regulating means for controlling the amount of lubricant sprayed into the line.

Referring now to the drawings, the air line lubricating device embodying our invention is designated generally by the reference character 10. Same includes a bowl 11 which may be made from some strong, transparent material such as plastic or glass, so that lubricant 12 carried therein may be seen. The bowl 11 is secured to a head 13 in a recess 14 provided on its undersurface into which the upper lip of the bowl 11 is seated. The lip is formed with an overhanging flange 16 and there may be a suitable gasket 17 between the flange 16 and the seat. An annular ring 18 engages the bottom of the head 13 in an edge-to-edge juncture 19 and a shoulder 20 formed on the inside of the ring 18 engages beneath the flange 16 for securing the bowl 11 to the head 13. Suitable cap screws 21 extend through the head 13 at spaced positions thereabout and threadedly engage the ring 18 tightly to hold the device 10 in assembly.

The upper surface of the head 13 is provided with a diametrically extending cylindrical ridge 22 which may be and preferably is integral with the head. A central passageway 23 is provided in the ridge 22 throughout its length and transverse of the head 13 and also perpendicular to the axis of the bowl 11. In the operation of the device 10, the normal position of the cup is with its axis vertical as shown in the figures.

The passageway 23 is connected with the air line 24 in a well-known manner. The left hand end of the passageway is threaded at 25 and the line 24 is connected thereto by an ordinary pressure coupling 26. The right hand end of the passageway 23 is threaded at 27 and is connected to the air line by the pressure coupling 28. The direction of flow of air through the device is from left to right as viewed in Figs. 1 and 2. As will be further explained, the device is so constructed that same operates properly when so associated with the line 24. Consequently, it is desirable to provide the device 10 with some indicia indicating the association of parts which insures proper direction of air flow. Toward this end I may provide an arrow 29 on the top of the ridge 22, which arrow may be stamped or otherwise formed in the metal from which the device is formed.

The construction of the device as thus far described is conventional. It is not intended to be limited thereto by way of size or proportion of the parts as changes therein no doubt could occur to skilled artisans without diverging from the aims of the invention and the objects thereby accomplished.

To accomplish the objects which we have attributed to this invention, we provide means hereinafter described to withdraw fluid lubricant 12 from the bowl 11 and reduce same to a finely dispersed spray before supplying same to the passageway 23 to be carried through the line 24 to the pneumatic tool.

In proximity to the left hand end of the passageway 23 there is a vertical duct 31 which communicates with the passageway 23. A hollow cylinder 32 has one end 33 thereof secured within the said duct by means of the threads 34 and in communication with the duct. The opposite end of the cylinder consists of a reduced diameter portion 35 also provided with threads for attachment to a block member 36.

The block member 36 may be formed from metal or other suitably rigid material. The member 36 may be formed by a solid block and thereafter have a central, horizontal passageway or bore 37 drilled therethrough along its entire length. The opposite ends of the passageway 37 thereafter may be closed by means of plugs 38, 39 secured therein. At one end of the block 36 is provided a vertical duct 40 communicating at its top end with the upper surface 41 of said block, the opposite end 42 being closed and disposed in line with the passageway 37 to communicate therewith. It will be noted that the duct 40 is disposed perpendicularly to the passageway 37 and in communication therewith.

The opposite end of the block also is provided with a second vertical duct 43 having its top end opening to the surface 41 and its opposite end communicating with a vertical opening 44 in the block 36 opening to the bottom surface 45 thereof. Mounted within the opening 44 is a short tube 46 having a portion 47 depending from the block and another portion 48 extending up into the duct 43 removed from the passageway 37. A short nozzle 49 is secured within the upper end of the duct 43 having its lower portion surrounding the end of portion 48 and its upper end disposed in the recess 14 of the head. Secured over the portion 47 is an elongate tube 50 having its free end 51 adapted to be disposed in the body of fluid lubricant 12.

Immediately above the nozzle 49 is provided a second vertical duct 52 communicating with the passageway 23 and recess 14. In the duct is secured a fine mesh screen member designated 53.

The manner in which the device 10 operates is as follows: Air entering the device from the left hand side thereof passes through the duct 31 into the passageway 40, then into passageway 37 and thereupon out of the passageway into the chamber 43. From there, the air passes out of the chamber 43 through the nozzle 49 into the recess 14. The compressed air flowing past the open end of the tube 46 will create a low pressure area thereat whereby to cause the fluid lubricant 12 to be drawn up into the tube 50, out through tube 46, and nozzle 49. Upon emerging into the recess 14, the fluid lubricant will be dispersed and atomized, the greater part of the spray dispersed passing through the screen 53 which will break up larger droplets if any exist. In this manner, the lubricant entering the passageway 23 already is finely divided and may be further broken up by the air passing through the passageway 23.

It will be noted that lubricant not sprayed into the passageway 23 will fall back into the bowl.

Referring to Figs. 1 and 3, there may be seen the regulating means provided for controlling the amount of lubricant spray introduced into the passageway 23. Between the ducts 31 and 52 there is provided a fitting 55 which is secured to the upper wall of the ridge 22. The bottom of the fitting is screw threaded into a suitable opening formed in the ridge 22 as indicated at 56, and the upper end of the fitting 55 also is threaded as shown at 57. The center of the fitting has a screw threaded passageway into which is fitted an elongate stem 58 the upper end of which has a knurled thumb screw 59 and the lower end of which extends into and across the passageway 23 to pass through an opening 60 in a plug 61. The plug 61 may be formed as a hollow member so that the stem 58 may be secured therein by means of the nut 62.

The plug 61 is adapted to ride in and out of a well 63 in the member 64 screw-threaded into the undersurface of the recess 14. The head 13 is provided with an opening 66 through which the plug 64 may be reciprocated. By manipulating the thumb screw 59, the plug may be selectively disposed in the passageway 23 closing off a portion thereof or all of it as may be desired. Air is supplied to the downstream end of the line by maintaining the upstream and at constant pressure. Each cycle of the air-operated tool causes air to pass into the downstream side of the passageway 23 either past the plug 61 or through the atomizer conduit 31. The amount of air passing through the duct 31 may be regulated by varying the position of plug 61 thereby permitting the amount of lubricant spray supplied to the passageway 23 to be controlled.

In order to fill the bowl 11 without disconnecting the entire device from the line, a filler plug 70 is screw-threaded into an appropriate opening 71 in the top of the head 13 which opening communicates with the bowl 11.

In connection with the operation of the regulating valve construction heretofore described, the tube 50 preferably is formed of a flexible transparent material, such as plastic. This enables the amount of lubricant drawn into or through tube 50 to be observed. Thus, with the plug 61 completely disposed in the well 63, and passageway 23 wide open, there may be a small quantity of air passing through the duct 31, while a tool is being used, but probably insufficient to cause lubricant to be drawn up the tube 50. The plug 61 then may be withdrawn from the well to a position blocking off a portion of the passageway 23 to cause more air to be supplied to the tools through duct 31. As the plug is thus adjusted, the observer may watch the lubricant rising higher and higher until flow is noted as tools are used. The user may thus be enabled to determine the amount of adjustment in the position of the plug 61 in the passageway 23 which is required to obtain desired quantities of lubricant spray supplied to the passageway. By making the tube 50 transparent, there are provided indicating means in the bowl for observing, at least approximately, the amount of fluid lubricant supplied to the passageway 23 as the regulating valve is adjusted.

It is believed that the invention has been sufficiently described in order to enable construction, use and practice thereof by the skilled artisan. It is again pointed out that considerable variation is possible in minor details of the device without in any way departing from the spirit of the invention, and it is desired to be limited in scope only by the claims hereto appended.

We claim:

1. A lubricating device for insertion into a compressed air line for pneumatically operated tools and including a head having a transverse passageway therethrough for connection at respective ends thereof into said line, a bowl secured to the head and having a body of fluid lubricant in the bottom thereof and an air chamber in the bowl above the said body, a first duct in the head communicating from the upstream end of said passageway to the chamber, and a second duct in the head communicating from the downstream end of the said passageway to the chamber, an atomizer in the chamber adjacent said second duct and having a part dipping into the body of lubricant and said atomizer being pointed in a direction toward the passageway and directing a spray of lubricant through the second duct and into the downstream end of the passageway, said atomizing means having air communication with said first duct whereby air diverted from the upstream end of the passageway will be conducted to said atomizing means to cause same to draw fluid from the body of lubricant and atomize said fluid, and a valve in the passageway for controlling the amount of air passing through the passageway and diverted to said first duct.

2. A device as described in claim 1 in which the valve is movable to any fixed position between conditions wherein the valve fully opens said passageway and where the valve fully blocks said passageway.

3. A device as described in claim 2 in which said passageway is unobstructed except for said valve and said valve includes a plug movable in said passageway and is located between the said ducts.

4. A lubricating device adapted to be inserted into a compressed air line for a pneumatic tool and including a head having a transverse passageway therethrough for connection into said line, a bowl secured to said head constituting a reservoir for a body of fluid lubricant and having an air chamber above said body, a first duct in said head connecting the upstream end of the passageway to said air chamber, means in said head for withdrawing lubricant from said body and atomizing the same, said means including a conduit opening at one end thereof in said body, and having an outlet in the chamber, a second conduit in said chamber connected to said upstream duct and arranged to lead air diverted from the passageway to said outlet to cause said means to operate, a second duct in said head at the downstream end of the passageway in substantial alignment with said outlet for receiving therethrough the atomized lubricant, and a valve in the passageway controlling the amount of air passing through the passageway and diverted through said second conduit.

5. A lubricating device adapted to be inserted into a compressed air line for a pneumatic tool and including a head having a transverse passageway therethrough for connection into said line, a bowl secured to said head constituting a reservoir for a body of fluid lubricant and having an air chamber above said body, a first duct in said head connecting the upstream end of the passageway to said chamber, and a second duct in the head communicating from the downstream end of the passageway to the chamber, atomizing means in the chamber including a conduit having an outlet in the chamber remote from said first duct and arranged to direct a spray of lubricant through the second duct into the downstream end of the passageway, and a part dipping into the body of lubricant, a second conduit in said chamber providing air communication between said first duct and said outlet whereby air diverted from the upstream end of the passageway will be conducted to said atomizing means for operating the same, and a valve in the passageway between said ducts for controlling the amount of air passing through the passageway and diverted to said first duct.

6. A device as described in claim 5 in which said second conduit comprises a substantially L-shaped block member having a channel therethrough, one leg of said member being connected to said first duct and said first conduit being secured to the other leg of said member in communication with said channel.

7. A device as described in claim 5 in which said second conduit comprises a block member having a channel therethrough, one end of said channel being in communication with said first duct and the second end of said channel terminating adjacent said outlet.

8. A device as described in claim 5 in which said passageway is unobstructed except for said valve, and said valve includes a member movable in said passageway located between said ducts and spaced from the first duct.

9. A lubricating device adapted to be inserted into a compressed air line for a pneumatic tool which comprises a head having a transverse passageway therethrough for connection at respective ends thereof into said line, a bowl having a sump therein with liquid lubricant disposed in the sump, said head being secured to the bowl and mounting an atomizing device including a nozzle for ejecting lubricant and an air conduit surrounding the nozzle for directing air from said line past the nozzle to atomize the lubricant ejected therefrom, a chamber in the bowl above the level of the lubricant and having a communicating passageway between itself and the downstream end of the transverse passageway, means connecting the upstream end of the transverse passageway to said air conduit for conducting a portion of the air entering the transverse passageway past the nozzle, and means supplying liquid lubricant to the nozzle including a tube dipping into the liquid lubricant, the atomizing device being positioned to spray atomized lubricant from the nozzle into said chamber to be conducted through the communicating passageway into the downstream end of the transverse passageway and subsequently into the line, and said head having means for controlling the amount of lubricant atomized at said nozzle.

10. A device as described in claim 9 in which the head includes a wall portion covering the bowl, and the atomizing device is arranged to spray lubricant into the bowl above the level of the lubricant, and said communicating passageway includes a vertical duct between the downstream end of the transverse passageway and the bowl through said wall.

References Cited in the file of this patent

UNITED STATES PATENTS

| Number | Name | Date |
|---|---|---|
| 1,907,045 | Curtis | May 2, 1933 |
| 2,073,009 | Hersey et al. | Mar. 9, 1937 |
| 2,187,241 | Kehle | Jan. 16, 1940 |
| 2,613,067 | Goodyer | Oct. 7, 1952 |